(12) United States Patent
Kanehisa

(10) Patent No.: US 7,617,920 B2
(45) Date of Patent: Nov. 17, 2009

(54) BICYCLE FREEWHEEL

(75) Inventor: Takanori Kanehisa, Sakai (JP)

(73) Assignee: Shimano Inc., Osaka (JP)

( * ) Notice: Subject to any disclaimer, the term of this patent is extended or adjusted under 35 U.S.C. 154(b) by 360 days.

(21) Appl. No.: 11/490,162

(22) Filed: Jul. 21, 2006

(65) Prior Publication Data

US 2008/0017471 A1    Jan. 24, 2008

(51) Int. Cl.
*F16D 41/30*    (2006.01)

(52) U.S. Cl. .............. 192/64; 192/46; 74/576

(58) Field of Classification Search .......... 192/46, 192/64; 74/576
See application file for complete search history.

(56) References Cited

U.S. PATENT DOCUMENTS

| | | | |
|---|---|---|---|
| 2,799,183 A | 7/1957 | Rhein et al. | |
| 2,988,186 A | 6/1961 | Dotter | |
| 3,557,922 A | 1/1971 | Schwerdhoefer | |
| 4,130,271 A * | 12/1978 | Merriman | 254/376 |
| 6,202,813 B1 * | 3/2001 | Yahata et al. | 192/64 |
| 6,533,700 B2 | 3/2003 | Shoge | |

FOREIGN PATENT DOCUMENTS

| | | |
|---|---|---|
| EP | 0-549-570 A2 | 6/1993 |
| GB | 1-135-818 | 12/1968 |
| JP | 56-164232 | 12/1981 |
| NL | 6-707-986 A | 12/1967 |

\* cited by examiner

*Primary Examiner*—Richard M. Lorence
(74) *Attorney, Agent, or Firm*—Global IP Counselors, LLP

(57) ABSTRACT

A freewheel basically has an inner tubular member, an outer tubular member rotatably mounted on an inner tubular member with a clutch pawl selectively connecting the outer and inner tubular members together. A pawl-retracting member is disposed between the outer and inner tubular members with the pawl-retracting member frictionally engaged with the internal circumferential surface of the outer tubular member to rotate with the outer tubular member between a pawl-retracting position in which the pawl-retracting member maintains the clutch pawl in a disengagement position and a pawl-releasing position in which the pawl-retracting member releases the clutch pawl to move to an engagement position.

11 Claims, 8 Drawing Sheets

BICYCLE FREEWHEEL

BACKGROUND OF THE INVENTION

1. Field of the Invention

This invention generally relates to a bicycle freewheel to be mounted to a hub of a bicycle. More specifically, the present invention relates to a bicycle freewheel having a pawl-retracting mechanism.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. The bicycle drive train has been extensively redesigned.

In many bicycles with multiple speeds, a wheel of the bicycle, typically the rear wheel, is provided with a hub having a gear changing mechanism or the like. Often the hub is provided with a freewheel that is arranged either as an integral part of the hub body or as a separate member. The freewheel usually has a one-way clutch function whereby it only transfers torque in one direction. One well-known conventional type of freewheel is provided with a pawl-type one-way clutch that includes ratchet teeth and a plurality of clutch pawls configured to selectively mesh with the ratchet teeth. In pawl-type one-way clutches, the clutch pawls are forced (spring loaded) toward engagement positions where they mesh with the ratchet teeth. Two examples of this type of freewheel are disclosed in U.S. Pat. Nos. 6,202,813 and 6,533,700, which are assigned to Shimano, Inc. The freewheels of these patents have a pawl retracting mechanism for moving the clutch pawls to disengagement positions. These freewheels work quite well. However, the pawl-retracting mechanism of the U.S. Pat. No. 6,202,813 requires a slide spring to move a pawl pressure component and the pawl-retracting mechanism in U.S. Pat. No. 6,533,700 must be actuated in response to shift operation. Therefore, these pawl-retracting mechanisms have a complex structure.

In view of the above, it will be apparent to those skilled in the art from this disclosure that there exists a need for an improved bicycle freewheel. This invention addresses this need in the art as well as other needs, which will become apparent to those skilled in the art from this disclosure.

SUMMARY OF THE INVENTION

One object of the present invention is to provide a freewheel with a pawl-retracting mechanism that is simple and inexpensive to manufacture and assemble.

In accordance with one aspect of the present invention, the foregoing object can basically be attained by providing a bicycle freewheel that basically comprises an inner tubular member, an outer tubular member, at least one bearing assembly, a clutch pawl, a biasing member and a pawl-retracting member. The inner tubular member is configured to be coupled to a bicycle hub. The outer tubular member is arranged around an outer side circumference of the inner tubular member, with an internal circumferential surface of the outer tubular member having a plurality of ratchet teeth. The bearing assembly is disposed between the inner tubular member and the outer tubular member to rotatably couple the outer tubular member to the inner tubular member such that the outer tubular member rotates freely with respect to the inner tubular member. The clutch pawl is disposed on the outer side circumference of the inner tubular member and freely movable between an engagement position in which the clutch pawl engages the ratchet teeth and a disengagement position in which the clutch pawl is disengaged from the ratchet teeth. The biasing member applies an urging force to the clutch pawl to urge the clutch pawl toward the engagement position. The pawl-retracting member is disposed between the inner tubular member and the outer tubular member with the pawl-retracting member frictionally engaged with the internal circumferential surface of the outer tubular member to rotate with the outer tubular member between a pawl-retracting position in which the pawl-retracting member maintains the clutch pawl in the disengagement position and a pawl-releasing position in which the pawl-retracting member releases the clutch pawl to move to the engagement position.

Accordingly with this invention, because the pawl-retracting member is rotated by friction exerted between the pawl-retracting member and the outer tubular member of the freewheel, no complex structure is required to retract the clutch pawls. Thus, with this arrangement, improved wheel-rotation efficiency (because of reduction of friction between clutch pawls and ratchet teeth) and reduction of pawl noise are achieved inexpensively.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
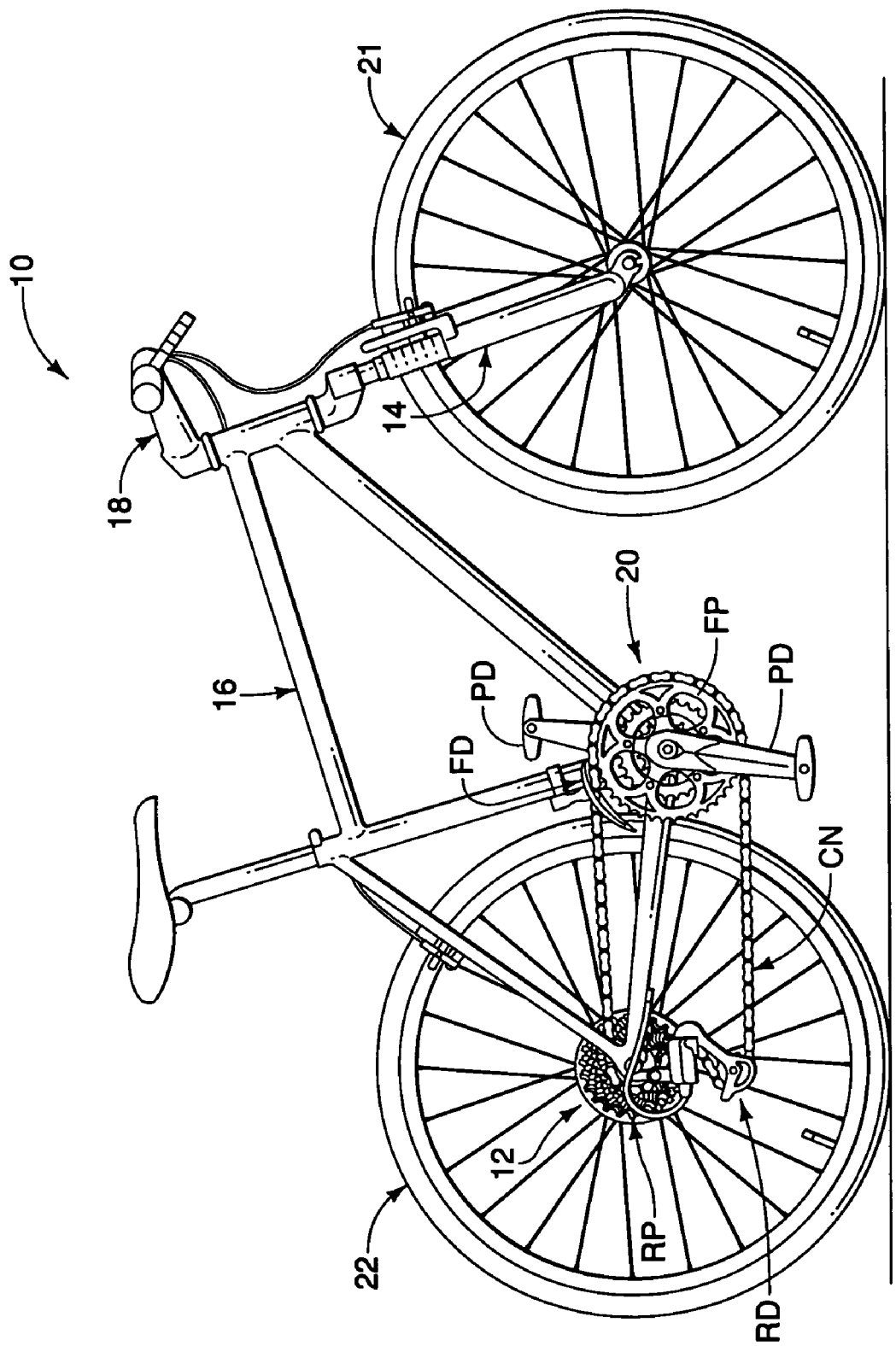
FIG. 1 is a side elevational view of a bicycle that is equipped with a rear hub that includes a freewheel in accordance with one embodiment of the present invention.

Referring initially to FIG. 1, a bicycle 10 is illustrated that is equipped with a rear hub 12 in accordance with a first embodiment of the present invention. As seen in FIG. 1, the bicycle 10 is arranged as a mountain bike. The bicycle 10 basically includes a front fork 14, a diamond-shaped frame 16, a handlebar 18, a drive unit 20, and a pair of front and rear wheels 21 and 22. The frame 16 has the front fork 14 movably coupled thereto. The handlebar 18 is fixedly coupled to the front fork 14 to turn the front wheel 21. The drive unit 20 basically comprises a chain CN, a pair of pedals PD, a front derailleur FD, a rear derailleur RD, a plurality of front sprockets FP, a plurality of rear sprockets RP and other conventional parts. The rear hub 12 is coupled to a center portion of the rear wheel 22.

Figure 2:
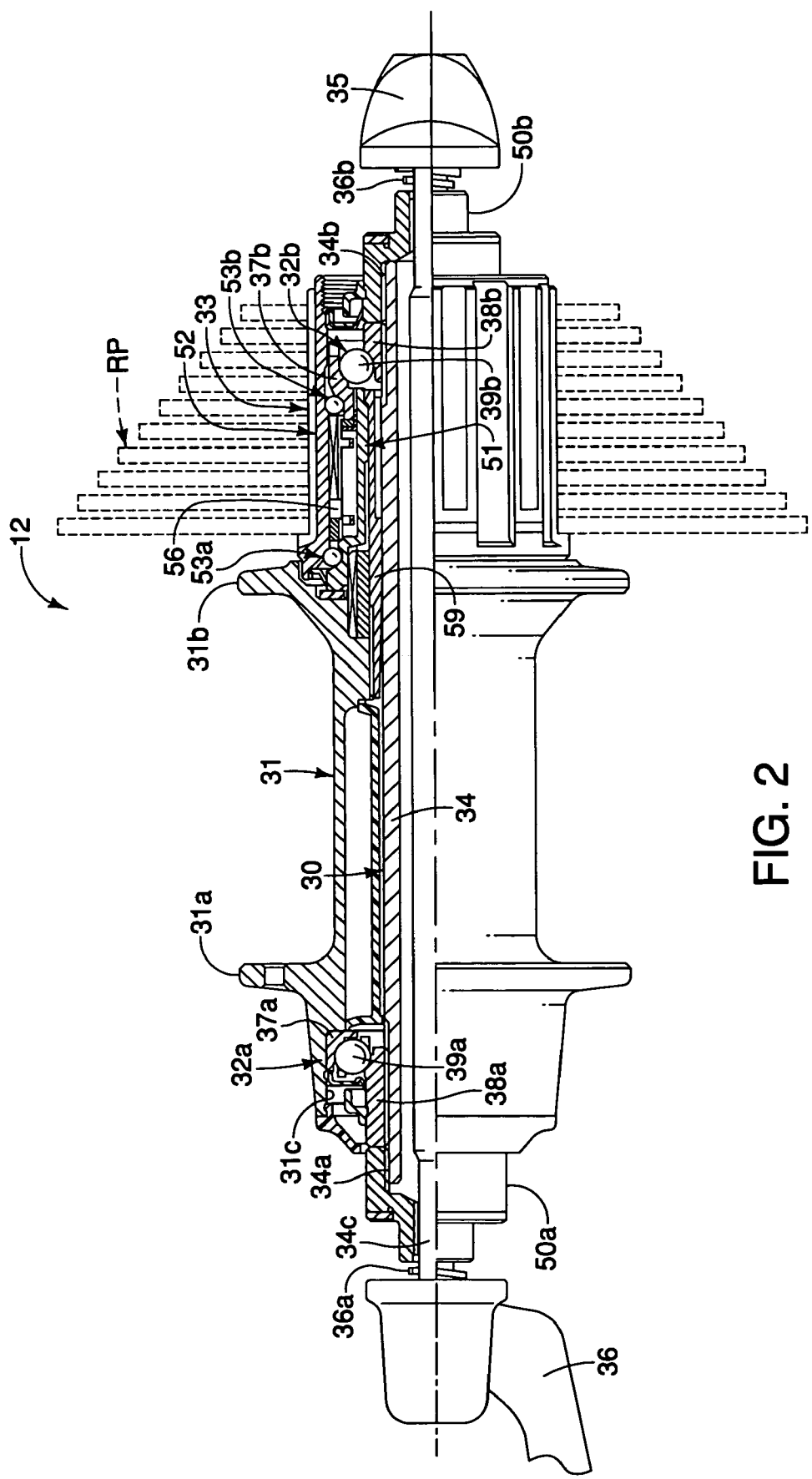
FIG. 2 is a half-cross sectional view of the rear hub on which the freewheel is installed in accordance with the present invention.

As shown in FIG. 2, the rear hub 12 basically has a hub axle 30, a hub body or shell 31, a pair (first and second) of bearing assemblies 32a and 32b and a freewheel 33 in accordance with an embodiment of the present invention. The hub axle 30 is configured to be detachably mounted to a rearward portion of the frame 16 (see FIG. 1). The hub body 31 is arranged around the outside circumference of the hub axle 30. The freewheel 33 is coupled to the right-hand end of the hub body 31 (when viewed as shown in FIG. 2). The freewheel 33 has a rear sprocket cluster RP comprising, for example, ten sprockets mounted thereon such that the sprocket cluster RP can rotate as an integral unit with the freewheel 33. The first and second bearing assemblies 32a and 32b are arranged between the hub axle 30 and the hub body 31 and between the hub axle 30 and the freewheel 33.

The hub axle 30 is a quick-release hub axle having a hollow axle main body 34 that has a right-hand (for example) external thread 34a arranged to span from a position slightly axially inward of the portion where the first bearing assembly 32a is installed to the axially outward end of the axle main body 34. The hollow axle main body 34 also has a right-hand external thread 34b that spans from a position slightly axially inward of the portion where the freewheel 33 is mounted to the axially outward end of the axle main body 34. The hub axle 30 also has a quick-release hub rod 34c, an adjustment nut 35 and a cam lever 36. The quick-release hub rod 34c is arranged so as to pass through the hollow axle main body 34.

The adjustment nut 35 screws onto one end of the quick-release hub rod 34c. The cam lever 36 engages with the other end of the quick-release hub rod 34c. A first volute spring 36a is installed between one end (left-hand end in FIG. 2) of the axle main body 34 and the cam lever 36. A second volute spring 36b is installed between the other end (right-hand end in FIG. 2) of the axle main body 34 and the adjustment nut 35.

The hub body 31 is a generally cylindrical member made of, for example, an aluminum alloy. The hub body 31 has a pair of hub flanges 31a and 31b provided on both ends of the external circumference of the hub body 31. The hub flanges 31a and 31b are configured for connecting spokes thereto. A bearing installation section 31c is formed in one end face (left-hand end face in FIG. 2) of the hub body 31. The bearing installation section 31c is configured to install the first bearing assembly 32a therein.

The first bearing assembly 32a is a ball bearing that comprises a first outer race 37a, a first inner race 38a, and a plurality of spherical bodies (balls) 39a. The spherical bodies (balls) 39a are arranged between the two races 37a and 38a. Similarly, the second bearing assembly 32b is a ball bearing that comprises a second outer race 37b, a second inner race 38b, and a plurality of spherical bodies (balls) 39b. The spherical bodies (balls) 39b are arranged between the two races 37b and 38b. Each set of spherical balls 39a and 39b is held by a retainer (not shown) such that adjacent balls of each set maintain a prescribed circumferential spacing therebetween.

The first outer race 37a is press fitted into the bearing installation section 31c formed in the hub body 31. The second outer race 37b is screwed onto the freewheel 33. The first and second inner races 38a and 38b are both screwed onto externally threaded sections 34a and 34b, respectively, that are formed on the axle main body 34 of the hub axle 30 and function as ball pushing members used to adjust the amount of axial play in the bearing assemblies 32a and 32b. Lock nuts 50a and 50b are arranged so as to contact the axially outward facing sides of the first and second inner races 38a and 38b, respectively, and serve to prevent the first and second inner races 38a and 38b from rotating and moving in the axial direction.

Figure 3:
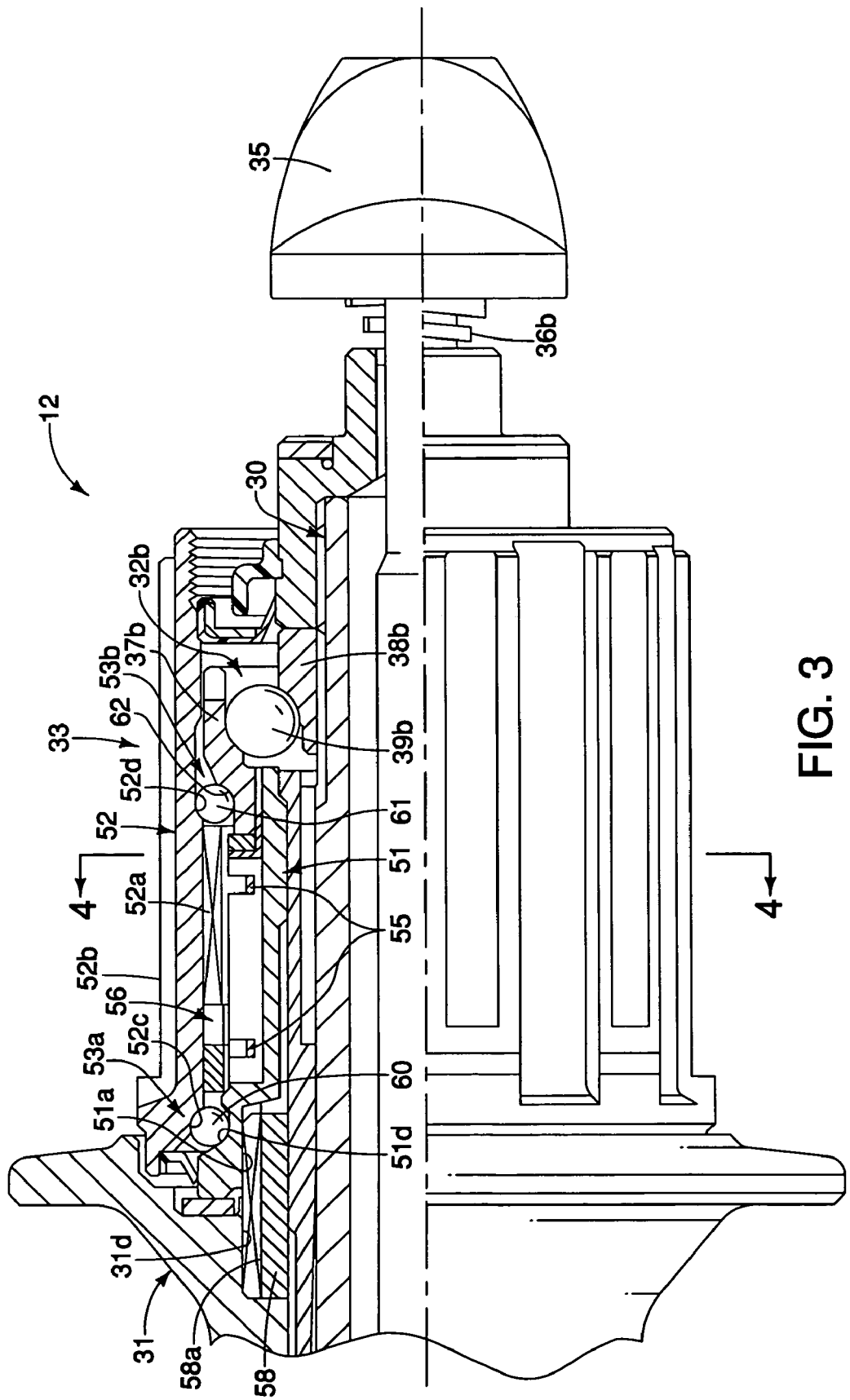
FIG. 3 is an enlarged half-cross sectional view of the freewheel portion of the rear hub illustrated in FIG. 2 in accordance with the present invention.

As shown in FIG. 3, the freewheel 33 basically includes an inner tubular member 51, an outer tubular member 52, a pair of bearing assemblies 53a and 53b, a pair of clutch pawls 54, a pair of biasing members 55 and a pawl-retracting member 56. The inner tubular member 51 is configured to be fixedly coupled to the hub body 31. The outer tubular member 52 is arranged around the outside circumference of the inner tubular member 51. The bearing assemblies 53a and 53b are arranged between the inner tubular member 51 and the outer tubular member 52 and configured to couple the outer tubular member 52 to the inner tubular member 51 such that the outer tubular member 52 can rotate freely with respect to the inner tubular member 51. The clutch pawls 54 are configured to transfer forward rotation of the outer tubular member 52 (i.e., rotation corresponding to forward movement of the bicycle) to the inner tubular member 51 and not transfer rearward rotation of the outer tubular member 52 to the inner tubular member 51.

Figure 5:
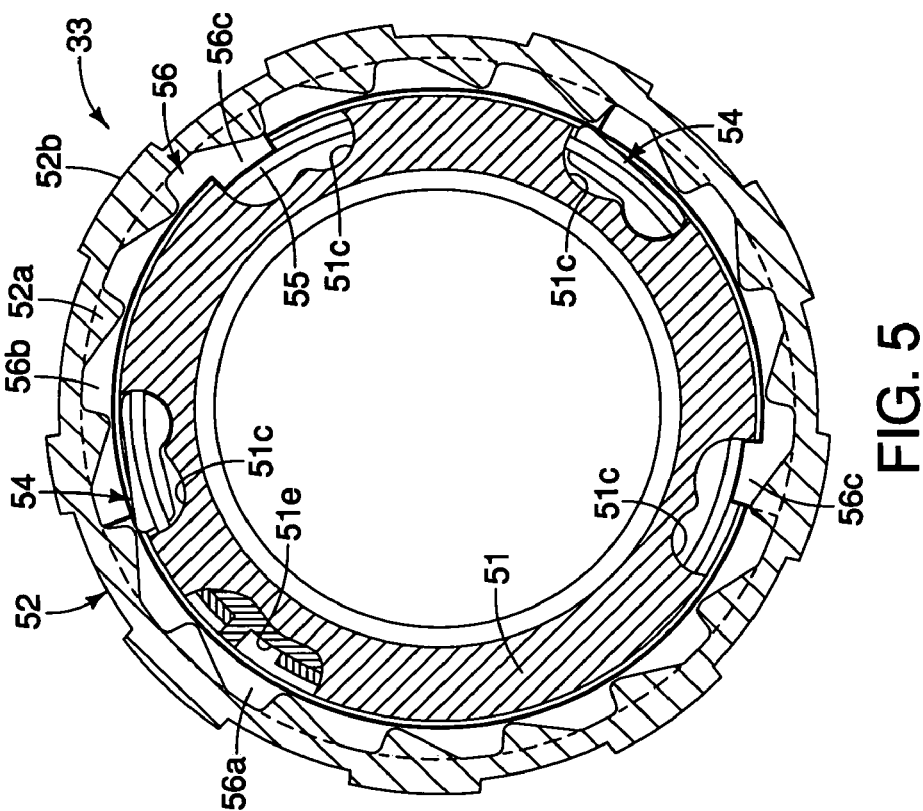
FIG. 5 is a transverse cross sectional view, similar to FIG. 4, of the one-way clutch of the freewheel in accordance with the present invention, but with the pawl-retracting mechanism moved to allowed the clutch pawls of the freewheel to move in their extended or engagement positions.
Figure 4:
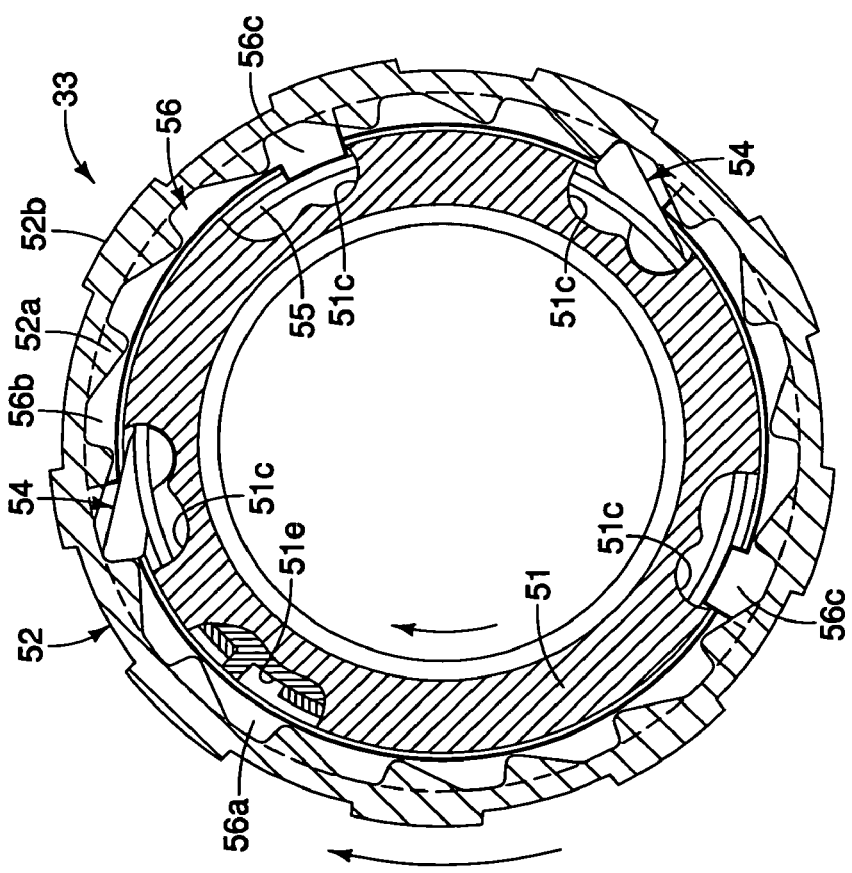
FIG. 4 is a transverse cross sectional view of the one-way clutch of the freewheel in accordance with the present invention, as seen along section line 4-4 of FIG. 3 with the clutch pawls of the freewheel being maintained in their retracted or disengagement positions by the pawl-retracting mechanism.

As shown in FIGS. 4 to 5, the pawl-retracting member 56 is disposed between the inner tubular member 51 and the outer tubular member 52. The pawl-retracting member 56 is frictionally engaged with the internal circumferential surface of the outer tubular member 52 to rotate with the outer tubular member 52 between a pawl-retracting position in which the pawl-retracting member 56 maintains the clutch pawls 54 in their disengagement positions (FIG. 4) and a pawl-releasing position in which the pawl-retracting member 56 releases the clutch pawls 54 to move to their engagement positions (FIG. 5).

As shown in FIGS. 8 to 11, the pawl-retracting member 56 is an annular member that includes an annular or arcuate base portion 56a, a pair of pawl-interacting portions 56b and a pair of movement-restricting portions 56c. The pawl-interacting portions 56b extend axially from the annular base 56a. The movement-restricting portions 56c extend inwardly from at least one of the base portion 56a and the pawl-interacting portion 56b in a radial direction. Preferably, the pawl-retracting member 56 is a one-piece, unitary member made of non-metallic material such as resin material.

The base portion 56a is at least an arcuate member that curves around the outer side circumference of the inner tubular member 51. In the illustrated embodiment, the base portion 56a is ring shaped member that encircles the inner tubular member 51. The inner diameter of the base portion 56a is slightly larger that the outer side circumference of the inner tubular member 51 so that a very small gap exist therebetween. The outer diameter of the base portion 56a is frictionally contacting the inner side circumference of the outer tubular member 52 so that movement the outer tubular member 52 causes the pawl-retracting member 56 to move therewith until the movement-restricting portions 56c contact the inner tubular member 51 as explained below.

The clutch pawls 54 are retracted by the rotational movement of the pawl-retracting member 56. In particular, the pawl-interacting portions 56b holds down the clutch pawls 54 when the pawl-retracting member 56 rotates to its pawl-retracting position. In such a structure mentioned above, the pawl-retracting member 56 is rotated by friction exerted between the outer surface of the pawl-retracting member 56 and the inner surface of the outer tubular member 52 of the freewheel 33.

Each of the movement-restricting portions 56c includes a pair of abutments that selectively contact the inner tubular member 51 to limit rotational movement therebetween. Thus, the movement-restricting portions 56c are configured and arranged to selectively contact the inner tubular member 51 to restrict the rotational movement of the pawl-retracting member 56.

The inner tubular member 51 is a step-shaped cylindrical member made of chromium-molybdenum steel or other comparatively high-strength steel material. The inner tubular member 51 is non-rotatably coupled with respect to the hub body 31 by a cylindrical coupling member 58 having serrations 58a formed on the external circumferential surface thereof. The serrations 58a of the coupling member 58 are configured to mesh with serrations 31d provided on an internal surface of the right-hand end of the hub body 31, and with serrations 51a provided on an internal surface of a larger diameter section of the left-hand end of the inner tubular member 51 (i.e., left-hand end as viewed in FIG. 3). The inner tubular member 51 is fastened to the hub body 31 with a cylindrical bolt 59 configured pass through the insides of the inner tubular member 51 and the coupling member 58 and screw into the internal surface of the hub body 31.

The inner tubular member 51 further includes a bearing installation section 51b, a plurality of clutch pawl installation recesses 51c, and a ball pushing surface 51d. The bearing installation section 51b includes threads formed on the external circumferential surface of the right-hand end of the inner tubular member 51 (i.e., the right-hand end when viewed as shown in FIG. 3) for installing the second bearing assembly 32b. The clutch pawl installation recesses 51c are formed around a portion of the external circumferential surface of the inner tubular member 51 located further inward in the axial direction than the bearing installation section 51b. The clutch pawl installation recesses 51c are arranged so as to be spaced apart from one another along a circumferential direction. Two of the clutch pawl installation recesses 51c are configured such that the clutch pawls 54 (described later) can be pivotally mounted therein. The other two pawl installation recesses 51c receive the movement-restricting portions 56c of the pawl-retracting member 56 to limit rotational movement of the pawl-retracting member 56 relative to the inner tubular member 51. The ball pushing surface 51d is formed on the external circumferential surface of the larger diameter portion of the inner tubular member 51 (i.e., left-hand end from the perspective of FIG. 3). The ball pushing surface 51d constitutes the inner race of a third bearing assembly 53a. Thus, the inner the left-hand end of the inner tubular member 51 supports the outer tubular member 52 in a freely rotatable manner.

Two spring arrangement grooves 51e (only one shown in FIGS. 6 and 7) are also formed in the external circumferential surface of the inner tubular member 51. The two spring arrangement grooves 51e are configured to run in the circumferential direction and arranged so as to be spaced apart from each other in the axial direction. Both of the spring arrangement grooves 51e are arranged to cross through the clutch pawl installation recesses 51c.

Figure 6:
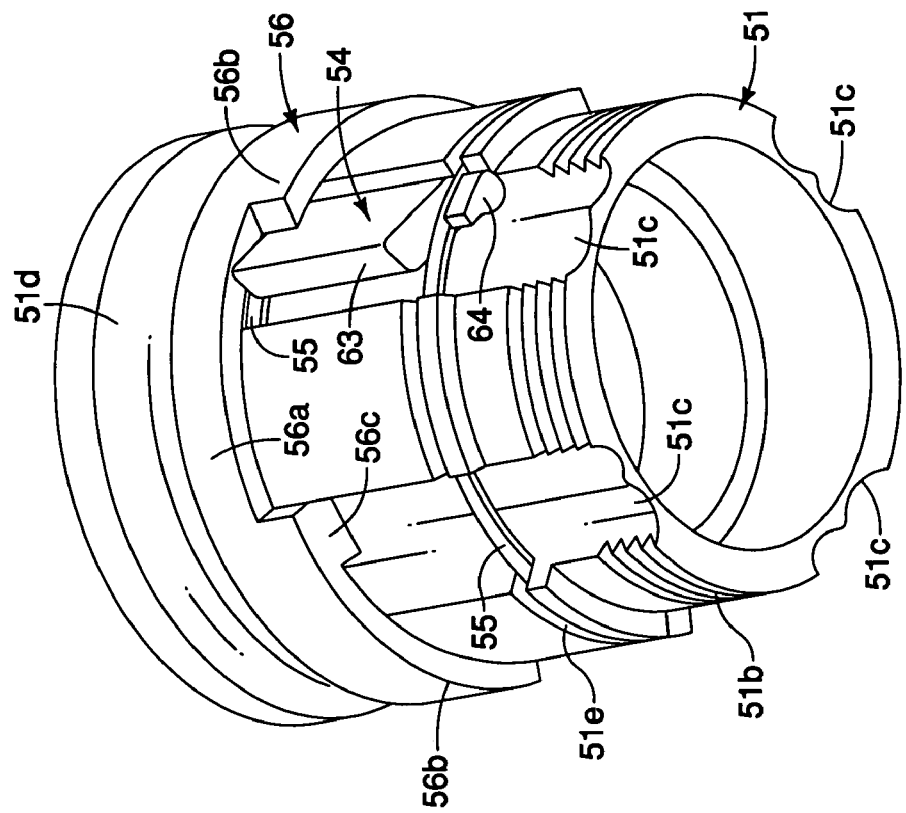
FIG. 6 is a perspective view of selected parts of the one-way clutch of the freewheel in accordance with the present invention, with the clutch pawls of the freewheel being maintained in their retracted or disengagement positions by the pawl-retracting mechanism.
Figure 7:
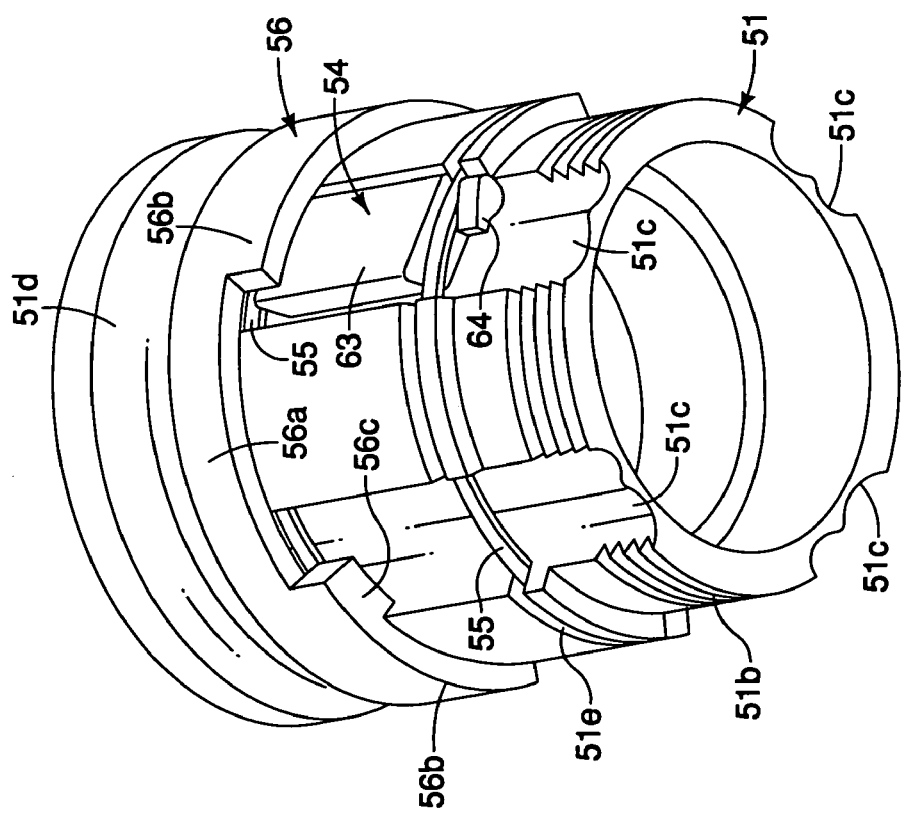
FIG. 7 is a perspective view, similar to FIG. 6, of selected parts of the one-way clutch of the freewheel in accordance with the present invention, but with the pawl-retracting mechanism moved to allowed the clutch pawls of the freewheel to move in their extended or engagement positions.
Figure 9:
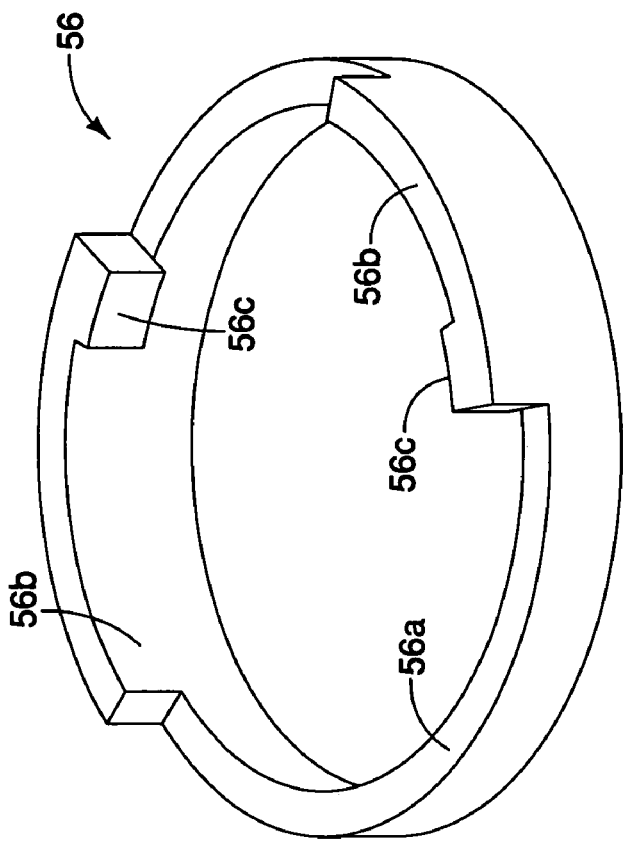
FIG. 9 is another perspective view of the pawl-retracting mechanism of the one-way clutch of the freewheel in accordance with the present invention.
Figure 8:
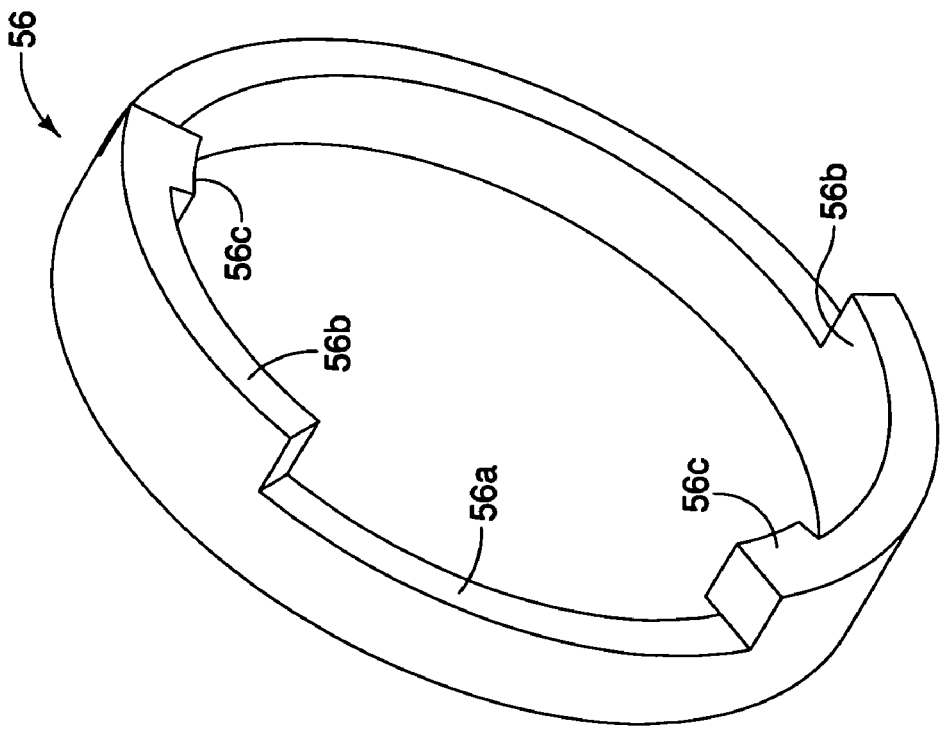
FIG. 8 is a perspective view of the pawl-retracting mechanism of the one-way clutch of the freewheel in accordance with the present invention.
Figure 11:
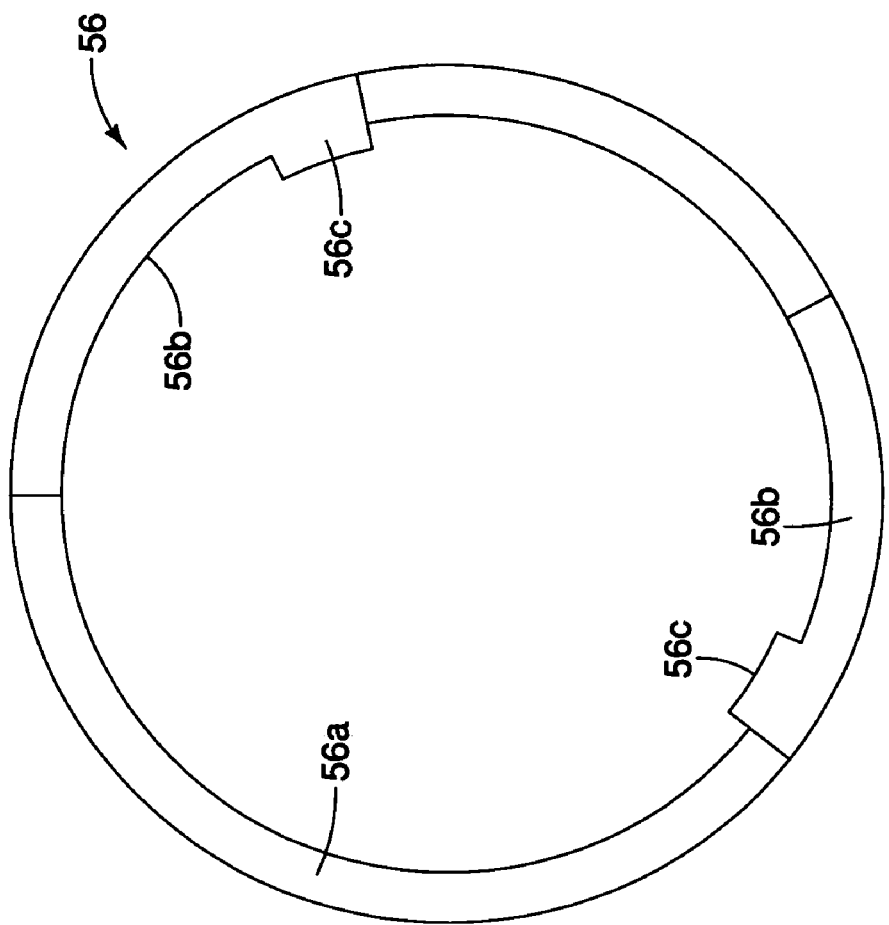
FIG. 11 is an axial elevational view of the pawl-retracting mechanism of the one-way clutch of the freewheel in accordance with the present invention.
Figure 10:
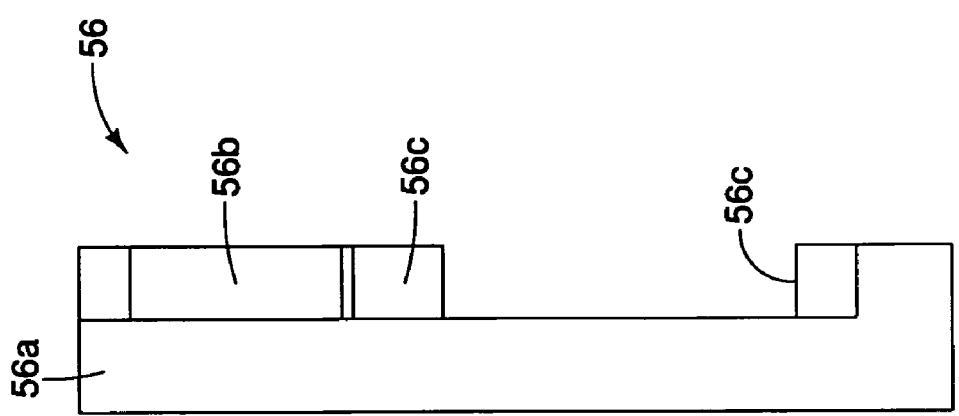
FIG. 10 is an enlarged, side elevational view of the pawl-retracting mechanism of the one-way clutch of the freewheel in accordance with the present invention.

As shown in FIGS. 6 and 7, each of the clutch pawl installation recesses 51c comprises two circular arc-shaped recessed sections, one larger and one smaller, that are joined together. The smaller recessed sections are where the clutch pawls 54 are attached. Each of the clutch pawl installation recesses 51c has a pair of stop surfaces that are selectively contacted by the movement-restricting portion 56c of the pawl-retracting member 56 to limit rotational movement therebetween. In particular, the movement-restricting portions 56c are positioned in two of the clutch pawl installation recesses 51c of the inner tubular member 51 to prevent the pawl-retracting member 56 from rotating too much.

As shown in FIGS. 4 and 5, the outer tubular member 52 is arranged around an outer side circumference of the inner tubular member 51, with an internal circumferential surface of the outer tubular member 52 having a plurality of ratchet teeth 52a. The outer tubular member 52 has a sprocket mounting part 52b formed on an external circumferential surface of the outer tubular member 52. The sprocket mounting part 52b is configured to mount the rear sprocket cluster RP such that the rear sprocket cluster RP rotates as an integral unit with the outer tubular member 52. The clutch pawls 54 are positioned radially inwardly from the sprocket mounting part 52b. The outer tubular member 52 is supported in a freely rotatable manner on the external circumference of the inner tubular member 51. As shown in FIGS. 4 and 5, the sprocket mounting part 52b comprises, for example, nine protrusions with one of the protrusions having a smaller width (i.e., dimension in the circumferential direction) than the other protrusions.

The ratchet teeth 52a are arranged on the portion of the internal surface of the outer tubular member 52 that is located between the bearing assemblies 53a and 53b. The ratchet teeth 52a are arranged so as to be spaced apart from one another along a circumferential direction. In the embodiment shown in FIGS. 4 and 5, for example, there are eighteen of the ratchet teeth 52a with each of the ratchet teeth 52a being shaped like a saw tooth that is asymmetrical in the circumferential direction.

As shown in FIG. 3, the outer tubular member 52 is supported in a freely rotatable manner on the inner tubular member 51 by the bearing assemblies 53a and 53b. The ball bearing surfaces 52c and 52d are formed on the internal circumferential surface of the outer tubular member 52, and arranged so as to be spaced apart from each other in the axial direction. The ball bearing surfaces 52c and 52d serve as the outer races for the bearing assemblies 53a and 53b, respectively. The ratchet teeth 52a are provided axially between the ball bearing surfaces 52c and 52d. Thus, the clutch pawls 54 are disposed on the outer side circumference of the inner tubular member 51 and freely movable between an engagement position in which the clutch pawls 54 engages the ratchet teeth 52a and a disengagement position in which the clutch pawls 54 are disengaged from the ratchet teeth 52a. The biasing members 55 apply an urging force to the clutch pawls 54 to urge the clutch pawls 54 toward their engagement positions.

The bearing assemblies 53a and 53b are arranged between the inner tubular member 51 and the outer tubular member 52 and serve to mount the outer tubular member 52 onto the inner tubular member 51 such that the outer tubular member 52 can rotate freely with respect to the inner tubular member 51. The bearing assembly 53a is a ball bearing that comprises the ball bearing surface 52c, the ball pushing surface 51d and a plurality of spherical bodies (balls) 60. The ball bearing surface 52c is formed on the internal circumferential surface of the outer tubular member 52 and serves as an outer race of the bearing assembly 53a. The ball pushing surface 51d is formed on the external circumferential surface of the inner tubular member 51 and serves as an inner race of the bearing assembly 53a. The spherical bodies (balls) 60 are arranged between the ball bearing surface 52c and the ball pushing surface 51d. Likewise, the bearing assembly 53b is a ball bearing that comprises the ball bearing surface 52d, a ball pushing surface 62 of the second outer race 37b and a plurality of spherical bodies (balls) 61. The ball bearing surface 52d is formed on the internal circumferential surface of the outer tubular member 52 and serves as an outer race of the bearing assembly 53b. The ball pushing surface 62 is formed on the external circumferential surface of the outer race 37b of the second bearing assembly 32b and serves as an inner race of the bearing assembly 53b. The spherical bodies (balls) 61 are arranged between the ball bearing surface 52d and the ball pushing surface 62 of the second outer race 37b. Each set of spherical balls 60 and 61 is held by a retainer (not shown) such that adjacent balls of each set maintain a prescribed circumferential spacing therebetween.

As shown in FIGS. 4 and 5, the ratchet teeth 52a, the pawl clutches 54, the biasing members 55 and the pawl-retracting member 56 form a one-way clutch that serves to transfer only forward rotation of the outer tubular member 52 to the inner tubular member 51. The ratchet teeth 52a are provided on the internal circumferential surface of the outer tubular member 52. The clutch pawls 54 are arranged on the external circumferential surface of the inner tubular member 51 in such a manner as to be spaced apart from each other along a circumferential direction. The biasing members 55 are C-shaped spring members that are configured and arranged to apply an urging force against the clutch pawls 54 in a radial inward direction. Thus, the biasing members 55 constitute a force applying member.

The one-way clutch is provided for the purpose of transferring rotation from the outer tubular member 52 to the inner tubular member 51 only when the outer tubular member 52 rotates in the forward direction in FIG. 4 (i.e., the clockwise direction in FIG. 5). In other words, when the outer tubular member 52 rotates in the forward direction in FIG. 4, the outer tubular member 52 and the pawl-retracting member 56 rotate together such that the clutch pawls 54 are uncovered by the pawl-interacting portions 56b to allow the clutch pawls 54 to move to their engagement positions due to the urging force of the biasing members 55. Rotational movement of the pawl-retracting member 56 is limited by the movement-restricting portions 56c contacting one of the end stops of the clutch pawl installation recesses 51c. However, if the inner tubular member 51 rotates in the clockwise direction (i.e., the clockwise direction from the perspective of FIGS. 4 and 5) relative to the outer tubular member 52, the clutch pawls 54 will move beneath the pawl-interacting portions 56b to retract the clutch pawls 54. Once the end stops of the clutch pawl installation recesses 51c contact the movement-restricting portions 56c, the pawl-retracting member 56 will rotate with the inner tubular member 51 such that the rotation of the inner tubular member 51 will not be transferred to the outer tubular member 52.

In this embodiment, there are two of the clutch pawls 54 arranged to be spaced apart from one another along a circumferential direction. Each of the clutch pawls 54 is mounted in one of the clutch pawl installation recesses 51c of the inner tubular member 51 in such a fashion that it can pivot freely between an engagement position where it engages with one of the ratchet teeth 52a and the disengagement position where it does not engage with the ratchet teeth 52a. When the clutch pawls 54 are in the engagement position, torque can be transferred from the outer tubular member 52 to the inner tubular member 51.

Figure 13:
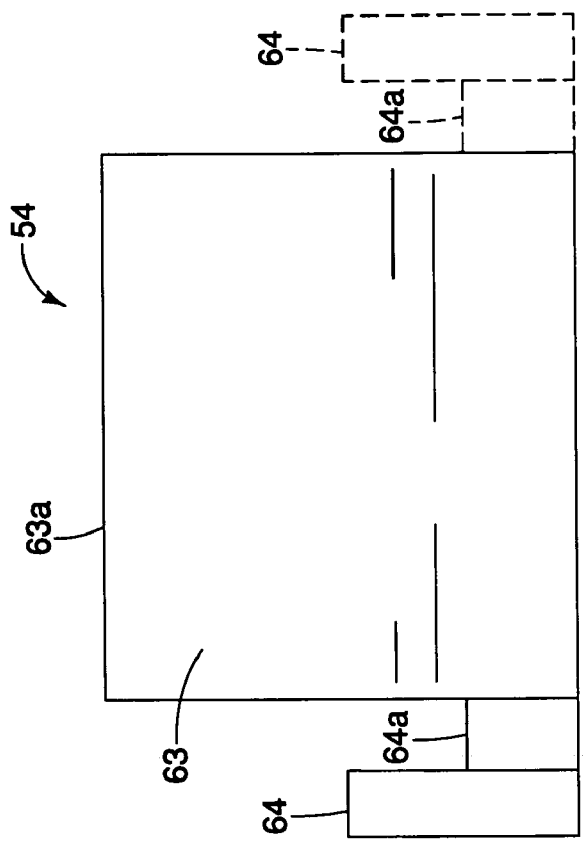
FIG. 13 is a top plan view of one of the clutch pawls of the one-way clutch of the freewheel in accordance with the present invention.
Figure 12:
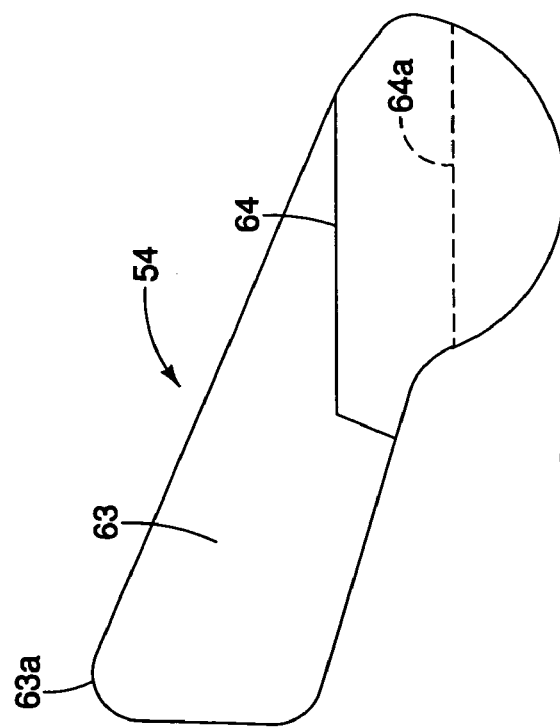
FIG. 12 is an enlarged side elevational view of one of the clutch pawls of the one-way clutch of the freewheel in accordance with the present invention.

As shown in FIGS. 12 and 13, the clutch pawls 54 are mirror images of each other. Thus, each of the clutch pawls 54 has a claw-like part 63 and a spring engaging part 64. The spring engaging part 64 is formed integrally on one side (left side in FIG. 13) for one of the clutch pawls 54 as shown in solid lines in FIG. 13, and formed integrally on the other side (right side in FIG. 13) for the other one of clutch pawls 54 as shown in broken lines in FIG. 13. A base end portion of the claw-like part 63 and the spring engaging part 64 are shaped like a circular arc that is configured to be mounted in one of the clutch pawl installation recesses 51c in such a fashion that the clutch pawl 54 can pivot freely. The claw-like parts 63 has a tip end section 63a configured to abut (selectively mesh with) against one of the ratchet teeth 52a. A spring engaging groove 64a is formed in the spring engaging part 64. The spring engaging grooves 64a are configured to engage one of the biasing members 55. Thus, one of the biasing members 55 acts on one of the clutch pawls 54 and the other one of the biasing members 55 acts on the other one of the clutch pawls 54. The spring engaging groove 64a is angled relative to the claw-like part 63. This configuration enables the clutch pawl 54 to stand up in the engagement position when one of the biasing members 55 engages the spring engaging groove 64a. The spring engaging groove 64a is configured such that it can be aligned with one or the other of the two spring arrangement grooves 51e along the circumferential direction when the clutch pawl 54 is mounted in the clutch pawl installation recess 51c.

In this embodiment, each of the biasing members 55 is made of a metal elastic wire-like material that has been bent into a C-shape such that it can be installed in one of the circular spring arrangement grooves 51e. Consequently, each of the biasing members 55 has an open end part and is thus shaped like a circle from which one small section has been cut out (i.e., a split ring). The biasing members 55 can be prevented from rotating and the open end parts can be prevented from being arranged at one of the clutch pawls 54. The biasing members 55 are curved such that the internal diameters thereof are the same or smaller than the external diameters of the bottom surfaces of the spring arrangement grooves 51e.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle freewheel comprising:
    an inner tubular member configured to be coupled to a bicycle hub;
    an outer tubular member arranged around an outer side circumference of the inner tubular member, with an internal circumferential surface of the outer tubular member having a plurality of ratchet teeth;
    at least one bearing assembly disposed between the inner tubular member and the outer tubular member to rotatably couple the outer tubular member to the inner tubular member such that the outer tubular member rotates freely with respect to the inner tubular member;
    a clutch pawl disposed on the outer side circumference of the inner tubular member and freely movable between an engagement position in which the clutch pawl engages the ratchet teeth and a disengagement position in which the clutch pawl is disengaged from the ratchet teeth;
    at least one biasing member applying an urging force to the clutch pawl to urge the clutch pawl toward the engagement position; and
    a one-piece, unitary pawl-retracting member with a fixed diameter disposed between the inner tubular member and the outer tubular member with the pawl-retracting member including an annular base portion with an annular surface having a fixed outer diameter, the annular surface of the annular base portion of the pawl-retracting member being frictionally engaged with the internal circumferential surface of the outer tubular member to rotate with the outer tubular member between a pawl-retracting position in which the pawl-retracting member maintains the clutch pawl in the disengagement position and a pawl-releasing position in which the pawl-retracting member releases the clutch pawl to move to the engagement position.

2. The bicycle freewheel as recited in claim 1, wherein the annular base portion of the pawl-retracting member encircles the inner tubular member.

3. The bicycle freewheel as recited in claim 1, wherein the pawl-retracting member includes a movement-restricting portion.

4. The bicycle freewheel as recited in claim 3, wherein the inner tubular member has a recess with a pair of stop surfaces.

5. The bicycle freewheel as recited in claim 3, wherein the movement-restricting portion of the pawl-retracting member includes a pair of abutments that selectively contact the inner tubular member to limit rotational movement therebetween.

6. The bicycle freewheel as recited in claim 1, wherein the clutch pawl includes a claw-like part configured to selectively mesh with the ratchet teeth, and a spring engaging part arranged on one side of the claw-like part and engaged with the biasing member.

7. The bicycle freewheel as recited in claim 1, wherein the outer tubular member includes a sprocket mounting part on an external circumferential surface of the outer tubular member, the sprocket mounting part being configured to mount a sprocket thereon such that the sprocket rotates as an integral unit with the outer tubular member.

8. The bicycle freewheel as recited in claim 7, wherein the clutch pawl is positioned radially inwardly from the sprocket mounting part.

9. The bicycle freewheel as recited in claim 1, wherein the pawl-retracting member is made of non-metallic material.

10. The bicycle freewheel as recited in claim 9, wherein the pawl-retracting member is made of resin material.

11. A bicycle hub comprising:
    a hub axle configured and arranged to be fastened to a frame of a bicycle;
    a hub body rotatably supported around an outside circumference of the hub axle; and
    a bicycle freewheel including
        an inner tubular member coupled to one end of the hub body,
        an outer tubular member arranged around an outer side circumference of the inner tubular member, with an internal circumferential surface of the outer tubular member having a plurality of ratchet teeth,
        at least one bearing assembly rotatably coupling the outer tubular member about the inner tubular member,
        a clutch pawl disposed on the outer side circumference of the inner tubular member and freely movable between an engagement position in which the clutch pawl engages the ratchet teeth and a disengagement position in which the clutch pawl is disengaged from the ratchet teeth, at least one biasing member applying an urging force to the clutch pawl to urge the clutch pawl toward the engagement position, and a one-piece, unitary pawl-retracting member with a fixed diameter disposed between the inner tubular member and the outer tubular member with the pawl-retracting member including an annular base portion with an annular surface having a fixed outer diameter, the annular surface of the annular base portion of the pawl-retracting member being frictionally engaged with the internal circumferential surface of the outer tubular member to rotate with the outer tubular member between a pawl-retracting position in which the pawl-retracting member maintains the clutch pawl in the disengagement position and a pawl-releasing position in which the pawl-retracting member releases the clutch pawl to move to the engagement position.

* * * * *